United States Patent
Makki et al.

(10) Patent No.: US 10,880,906 B2
(45) Date of Patent: Dec. 29, 2020

(54) APPARATUSES, METHODS AND COMPUTER PROGRAMS FOR IMPLEMENTING FAIRNESS AND COMPLEXITY-CONSTRAINED A NON-ORTHOGONAL MULTIPLE ACCESS (NOMA) SCHEME

(71) Applicant: Telefonaktiebolaget LM Ericsson (Publ), Stockholm (SE)

(72) Inventors: Behrooz Makki, Gothenburg (SE); Ali Behravan, Stockholm (SE); Mona Hashemi, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/760,081

(22) PCT Filed: Feb. 14, 2018

(86) PCT No.: PCT/EP2018/053620
§ 371 (c)(1),
(2) Date: Mar. 14, 2018

(87) PCT Pub. No.: WO2019/158190
PCT Pub. Date: Aug. 22, 2019

(65) Prior Publication Data
US 2019/0254043 A1 Aug. 15, 2019

(51) Int. Cl.
*H04W 72/12* (2009.01)
*H04W 72/04* (2009.01)
*H04W 52/24* (2009.01)
*H04W 52/34* (2009.01)
(Continued)

(52) U.S. Cl.
CPC ....... *H04W 72/121* (2013.01); *H04W 52/247* (2013.01); *H04W 52/346* (2013.01);
(Continued)

(58) Field of Classification Search
CPC ............ H04W 72/121; H04W 72/042; H04W 72/0473; H04W 72/1215; H04W 72/1289;
(Continued)

(56) References Cited

U.S. PATENT DOCUMENTS 9,986,515 B2 * 5/2018 Benjebbour ........ H04W 52/242
10,313,984 B2 6/2019 Benjebbour et al.
(Continued)

FOREIGN PATENT DOCUMENTS

| EP | 3 018 952 A2 | 5/2016 |
| WO | 2017/030490 A2 | 5/2016 |
| WO | 2017/105126 A1 | 6/2017 |

OTHER PUBLICATIONS

3GPP TS 38.321 V15.0.0 (Dec. 2017), "Medium Access Control (MAC) protocol specification" (Year: 2017).*
(Continued)

*Primary Examiner* — Yemane Mesfin
*Assistant Examiner* — Intekhaab A Siddiquee
(74) *Attorney, Agent, or Firm* — Sage Patent Group

(57) ABSTRACT

Embodiments disclosed herein provide a fairness and complexity-constrained uplink NOMA scheme. For example, various embodiments set the power/resource allocation for a particular UE (e.g., a weak UE) such that the minimum rate requirement of the UE is guaranteed, independently of the activation status of another UE (e.g., a strong UE). Additionally, in some embodiments the access point selects whether the UE uses a NOMA or OMA depending on the relative performance gain/cost of NOMA.

17 Claims, 14 Drawing Sheets

(51) Int. Cl.
  *H04W 72/02* (2009.01)
  *H04W 88/06* (2009.01)
  *H04W 88/10* (2009.01)
  *H04W 74/02* (2009.01)
(52) U.S. Cl.
  CPC ..... *H04W 72/042* (2013.01); *H04W 72/0473* (2013.01); *H04W 72/1215* (2013.01); *H04W 72/1268* (2013.01); *H04W 72/1289* (2013.01); *H04W 74/02* (2013.01); *H04W 88/06* (2013.01); *H04W 88/10* (2013.01)
(58) Field of Classification Search
  CPC . H04W 52/247; H04W 52/346; H04W 88/06; H04W 88/10
  USPC .......................................................... 370/336
  See application file for complete search history.

(56) References Cited

U.S. PATENT DOCUMENTS

2015/0312074 A1* 10/2015 Zhu ..................... H04L 27/2627
                                                                370/329
2018/0124684 A1*  5/2018 Kwon ................. H04W 72/044

OTHER PUBLICATIONS

3GPP TS 38.321 V2.0.0 (Dec. 2017), "Medium Access Control (MAC) protocol specification" (Year: 2017) (Year: 2017).*
3GPP TR 36.866 V12.0.1, 3rd Generation Partnership Project; Technical Specification Group Radio Access Network; Study on Network-Assisted Interference Cancellation and Suppression (NAIC) for LTE (Release 12), Mar. 2014, 64 pages.
3GPP TR 36.859 V13.0.0, 3rd Generation Partnership Project; Technical Specification Group Radio Access Network; Study on Downlink Multiuser Superposition Transmission, (MUST) for LTE (Release 13), Dec. 2015, 48 pages.
3GPP TSG RAN WG1 Meeting #86, R1-166056, "Final Report of 3Gpp TSG RAN WG1 #85 V1.0.0" MCC Support, Göteborg, Sweden, Aug. 2016, 170 pages.
Xu, Peng et al., "NOMA: An Information Theoretic Perspective", IEEE, arXiv: 1504.07751v2 [cs.IT], May 2015, 6 pages.
International Search Report and Written Opinion issued in International Application No. PCT/EP2018/053620, dated Oct. 16, 2018, 14 pages.
First Examination Report for Indian Patent Application No. IN 201847009527 dated on Oct. 12, 2020, 6 pages.

* cited by examiner

APPARATUSES, METHODS AND COMPUTER PROGRAMS FOR IMPLEMENTING FAIRNESS AND COMPLEXITY-CONSTRAINED A NON-ORTHOGONAL MULTIPLE ACCESS (NOMA) SCHEME

CROSS REFERENCE TO RELATED APPLICATION(S)

This application is a 35 U.S.C. § 371 National Stage of International Patent Application No. PCT/EP2018/053620, filed Feb. 14, 2018, designating the United States, the disclosure of which is incorporated by reference.

TECHNICAL FIELD

Disclosed are embodiments related non-orthogonal multiple access (NOMA).

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA exploits channel difference between or among UEs to improve spectrum efficiency. Particularly, the highest gain of NOMA is observed in the cases where a "strong" UE (e.g., a UE located close to an access point) and a "weak" UE (e.g., a UE located at or near a cell edge) are paired (i.e., use the same radio resources). However, the implementation of NOMA implies: 1) use of more advanced and complex receivers to enable multiuser signal separation, 2) more difficult synchronization, and 3) a higher signal decoding delay.

One main issue of uplink NOMA is possible rate loss of the strong UE. While uplink NOMA improves the sum throughput, compared to the cases with different OMA schemes, NOMA may have different effects on the cell-center and the cell-edge UEs. For different channel conditions, with high probability the cell-edge UE can transmit with higher rates, compared to the cases using OMA. However, depending on the interference caused by the cell-edge UE, the cell-center UE may lose some rate.

Another main issue of uplink NOMA is high implementation complexity and delay. The performance gain of NOMA is achieved at the cost of receiver complexity and delay. Particularly, NOMA implies complex receivers. Also, NOMA may lead to extra delays where, for instance, to decode the message of the weak UE (i.e., the UE having the poorest channel condition), the access point may need to first decode the messages of all other UEs paired with the weak UE. This increases the end-to-end transmission delay of the cell-edge UEs. Thus, whether or not to use NOMA depends on a tradeoff between the received gain and complexity/delay cost.

Embodiments disclosed herein provide a fairness and complexity-constrained uplink NOMA scheme. For example, various embodiments set the power/resource allocation for a particular UE (e.g., a weak UE) such that the minimum rate requirement of the UE is guaranteed, independently of the activation status of another UE (e.g., a strong UE). Additionally, in some embodiments the access point selects whether a UE uses a NOMA or OMA depending on the relative performance gain/cost of NOMA. Further, in some embodiments, the access point determines the transmission parameters of the strong UE depending on the selected multiple access scheme such that the strong UE uses the available spectrum efficiently. Accordingly, in some embodiments NOMA is used only if: 1) the required rate constraint of the weak UE is guaranteed and 2) the joint resource utilization of the strong and weak UEs is worth the implementation complexity, otherwise, the UEs are served by OMA schemes. Such embodiments guarantee not only the fairness for the weak UE, but also improve the achievable rate of the strong UE in many cases.

In one particular aspect there is provided a method performed by an access point (AP) for scheduling at least a first user equipment (UE) served by the access point and a second UE also by the access point. The method includes the AP determining a first transmission parameter ($TP_{2,OMA}$) for the second UE and for an orthogonal multiple access (OMA) scheme. The method also includes determining a second transmission parameter ($TP_{2,NOMA}$) for the second UE and for a non-orthogonal multiple access (NOMA) scheme. The method further includes determining, based on $TP_{2,OMA}$ and $TP_{2,NOMA}$, that the first UE and the second UE should be scheduled to use the same time and frequency resources to transmit uplink data. The method also includes scheduling the first UE and the second UE to use the same time and frequency resources to transmit uplink data.

In some embodiments, $TP_{2,OMA}$ is a first transmit power ($P_{2,OMA}$) for the second UE and for the OMA scheme, and $TP_{2,NOMA}$ is a second transmit power ($P_{2,NOMA}$) for the second UE and for the NOMA scheme.

In some embodiments determining, based on $TP_{2,OMA}$ and $TP_{2,NOMA}$, that the first UE and the second UE should be scheduled to use the same time and frequency resources to transmit uplink data comprises at least one of: 1) determining that: a) $P_{2,NOMA}$ is not greater than a power threshold and b) $P_{2,OMA}$ is greater than the power threshold; and 2) determining that: a) $P_{2,NOMA}$ is not greater than the power threshold and b) a relative power gain value is not less than a power gain threshold. In some embodiments, the relative power gain value equals: $(P_{2,OMA} - P_{2,NOMA})/P_{2,NOMA}$.

In one particular aspect there is provided a method performed by a user equipment (UE) for transmitting data for reception by an access point (AP). The method includes the UE transmitting to the AP a message comprising information indicating a requested data rate, R2. The method also includes the UE receiving a message transmitted by the AP, wherein the message transmitted by the AP indicates a multiple access transmission method selected by the AP based on the requested data rate. In some embodiments the method further includes the UE receiving a synchronization signal transmitted by the AP as a result of the AP selecting a non-orthogonal multiple access (NOMA) transmission method in dependence on the requested data rate.

Advantages that flow from this disclosure include satisfying the weak UE fairness constraints while also, with high probability, improving the achievable rate of the strong UE. Also, taking the complexity/delay costs of NOMA into account, NOMA-based data transmission is performed only if it leads to at least a certain energy saving for the weak UE. In this way, improved the system performance compared to the cases with OMA is achieved.

BRIEF DESCRIPTION OF THE DRAWINGS

The accompanying drawings, which are incorporated herein and form part of the specification, illustrate various embodiments.

DETAILED DESCRIPTION

Figure 1:
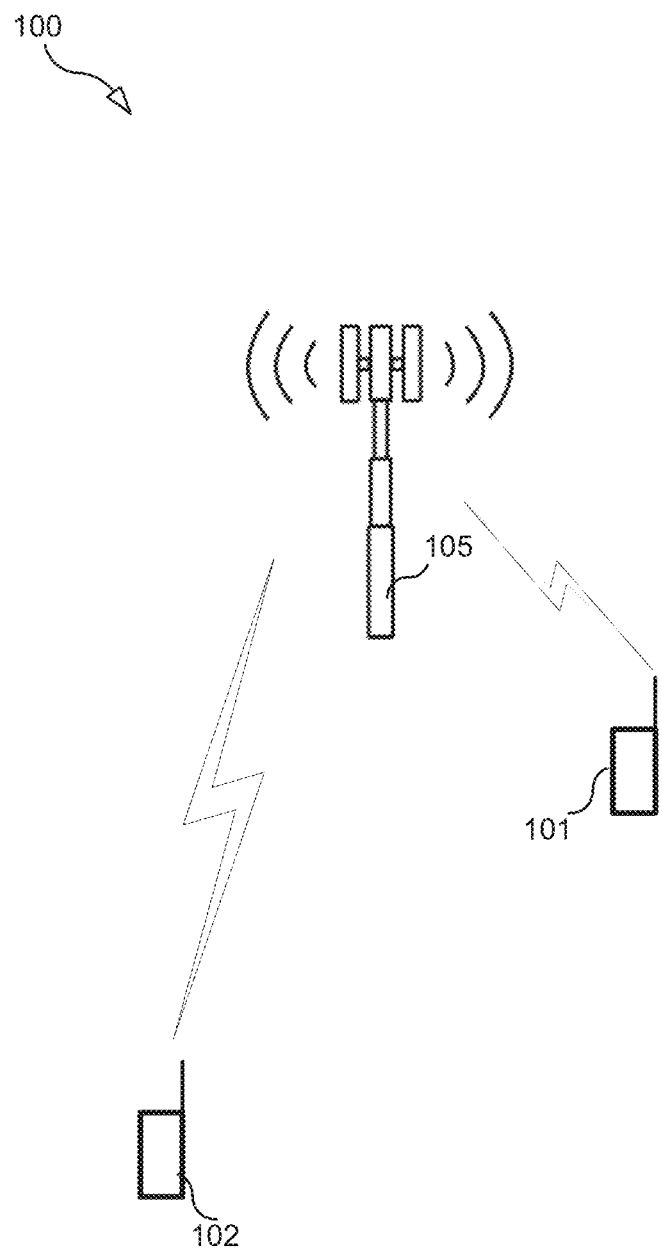
FIG. 1 illustrates an exemplary network.

FIG. 1 illustrates a network 100 having an access point (AP) 105 (e.g., a 4G or 5G base station or other access point) serving two UEs: UE 101 and UE 102. In this scenario, UE 102 is a weak UE (e.g., a cell-edge UE) and UE 101 is a strong UE (e.g. a cell-center UE). The two UEs have different channel (or "link") qualities. With OMA, the UEs signals are transmitted in orthogonal resources, for instance at the same time but in different frequency bands, and the AP 105 decodes the two transmitted signals separately. With NOMA, on the other hand, the UEs share the same frequency (or "spectrum"), time resources, and code or spreading resources, if any, to send their messages simultaneously. In such a NOMA scenario, the AP, using a SIC receiver, first decodes the message of UE 101 (the "strong" UE), considering the signal of UE 102 as noise. Then, after successfully decoding UE 101's signal, the AP subtracts UE 101's signal from the received signal and decodes UE 102's signal with no interference from UE 101.

Considering the transmission setup of FIG. 1, the achievable rates (R) of UEs 101 and 102, respectively, in the NOMA scheme are determined as:

$$\begin{cases} R_{1,NOMA} = \log_2\left(1 + \dfrac{P_1 G_1}{1 + P_2 G_2}\right) \text{ [bit/symbol]} & (i) \\ R_{2,NOMA} = \log_2(1 + P_2 G_2), \text{ [bit/symbol]} & (ii) \end{cases} \quad (1)$$

while for the OMA scheme:

$$\begin{cases} R_{1,OMA} = \alpha \log_2\left(1 + \dfrac{P_1 G_1}{\alpha}\right) \text{ [bit/symbol]} & (i) \\ R_{2,OMA} = (1-\alpha) \log_2\left(1 + \dfrac{P_2 G_2}{1-\alpha}\right) \text{[bit/symbol]}. & (ii) \end{cases} \quad (2)$$

Here, $P_1$ represents the transmission power of UE 101 and $P_2$ represents the transmission power of UE 102. Also, $G_1$ is the gain of the link (or "channel") between UE 101 and AP 105, $G_2$ is the gain of the link between UE 102 and AP 105, and $\alpha$ denotes the portion of the spectrum allocated to UE 101. $G_1$ and $G_2$ may be referred to as "channel gains." Moreover, we denote the maximum possible transmission power of the i-th UE by $P_{i,max}$, i=1, 2, and represent the requested data rate of UE 102 by $R_2$. Comparing equations (1.ii) and (2.ii), for a given power $P_2$ and channel gain $G_2$, the implementation of NOMA improves the achievable rate of UE 102, compared to OMA. For UE 101, however, depending on the added interference term $P_2 G_2$ in (1.i) the implementation of NOMA may lead to some rate penalties.

With this background, suppose that UE 102 has some important message to send and, due to, for example, scheduling, UE 102 has been in the scheduling queue for a long time. In this scenario, it is important to serve UE 102 as soon a possible. However, if the UE 102-AP 105 link experiences poor channel condition, the available spectrum will be wasted for this weak UE. Thus, it would be beneficial if both UE 102 and UE 101 can share the spectrum given that 1) the performance improvement is worth the additional decoding complexity/delay, 2) the rate constraint of UE 102 is satisfied and 3) compared to the rate achieved by OMA, UE 101 does not lose in terms of the achievable rate.

An example embodiment can be explained as follows. Consider a case where two UEs (UE 101 and UE 102) are being served by AP 105, and FDMA is the OMA scheme being used (the embodiments disclosed herein, however, can be used with other OMA schemes and any numbers of UEs). Also, for simplicity of expressions we set $\alpha=0.5$ in, while the embodiments are applicable for every value of α ∈ [0,1]. With UE 102 having an urgent need to send data with rate $R_2$, the data transmission scheme may be adapted, in some embodiments, using the following procedure:

Step 1

UE 102 notifies AP 105 of its requested data rate (a.k.a., data rate demand or capacity request) $R_2$. For example, in step 1 UE 102 may send a transmit buffer status report indicating the amount of data that UE 102 has queued for uplink transmission. UE 102 may also transmit a pilot signal so that AP 105 can determine $G_2$. Additionally, UE 102 may also indicate whether it can support OMA, NOMA or both of them. Further, UE 101 and/or UE 102 may also send a synchronization signal.

Step 2

AP 105 a) estimates the quality of the link between UE 102 and AP 105, i.e., AP 105 estimates $G_2$, b) uses (1.ii) and (2.ii) to find the transmit power required by UE 102 in NOMA and OMA schemes, respectively, and then c) decides whether to work in the NOMA or OMA mode.

Specifically, let us denote the UE 102 required power in the NOMA and OMA schemes by $P_{2,NOMA}$ and $P_{2,OMA}$, respectively. Note that, according to (1.ii)-(2.ii), we have $P_{2,OMA} \geq P_{2,NOMA}$ for every value of $R_2$. The procedure for deciding about the communication mode is as follows:

(a) If $P_{2,OMA}$ & $P_{2,NOMA} \geq P_{2,max}$, then UE 102 is turned off in this time slot (because there is no chance for it to correctly send the data with rate $R_2$), and UE 101 is served.

(b) If $P_{2,NOMA} \leq P_{2,max} < P_{2,OMA}$, then select the NOMA transmission mode.

(C) If $P_{2,OMA}$ & $P_{2,NOMA} \leq P_{2,max}$ and $\Delta \geq \theta\%$, then select the NOMA transmission mode.

(d) If $P_{2,OMA}$ & $P_{2,NOMA} \leq P_{2,max}$ and $\Delta < \theta\%$, then select the OMA transmission mode.

In one example, $$\Delta = \frac{P_{2,OMA} - P_{2,NOMA}}{P_{2,NOMA}}\%,$$

which is the relative power gain of NOMA compared to OMA. Also, we define a threshold value θ where the setup works in the NOMA mode if the relative power gain exceeds the threshold. In this way, θ whose value is set by the network designed takes into account the complexity and delay costs of NOMA approach. That is, depending on the value of θ, we use NOMA only if the relative power gain worth the additional complexity and delay cost. The above is one possible definition of Δ. However, different functions can be defined to represent the decoding delay/complexity cost.

Step 3

AP 105 sends to UE 102 a synchronization signal, information indicating the acceptable transmit power, and/or information indicating the selected transmission mode. For example, in step 3, AP 105 may send to UE 102 a scheduling message that includes the transmit power information and the transmission mode information.

Step 4

AP 105 sends to UE 101 a synchronization signal, a pilot signal (e.g., a cell specific reference signal), and/or information indicating the selected transmission mode.

Step 5

UE 101 uses the pilot signal transmitted in step 4 to estimate the AP-UE 101 channel quality, i.e., $G_1$ and, depending on the selected transmission mode, UE 101 determines its achievable rate as a function of its transmission power $P_1$. Then, depending on its rate of interest, UE 101 adapts its transmission power and modulation and coding scheme (MCS) (i.e., selects a transmission power and MCS) and then transmits its data using the selected transmission power and MCS.

According to Step 2, UE 102 is always served, unless the UE 102-AP link channel quality is so poor that, even with the maximum transmit power of UE 102 and independently of the transmission mode, there is no chance for UE 102 to correctly send the data with rate $R_2$, i.e., case (a) occurs.

Preferably, in the case where the OMA transmission mode is selected, UE 102 is served first, motivated by its long transmission queue.

Using the above procedure, UE 102 does not lose, in terms of power, compared to the cases working only in an OMA mode. The value of θ (i.e., how much complexity/decoding delay is acceptable for the network) determines the amount of power gained by UE 102.

Figure 2:
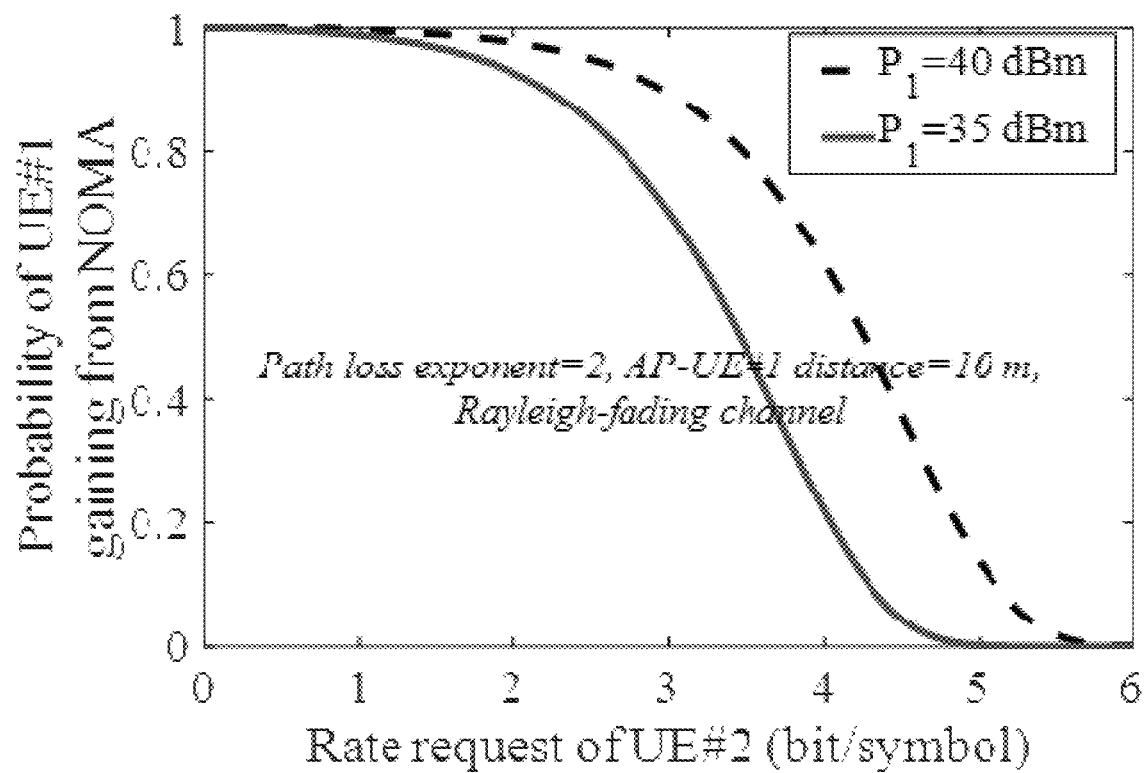
FIG. 2 is a graph illustrating the probability of a UE gaining from NOMA-based transmission.

Depending on the interference power received from UE 102, there is a small probability that the achievable rate of UE 101 is reduced by NOMA. To evaluate this effect, consider the worst-case scenario with $P_{2,max} \to \infty$ and θ=0, i.e., a virtual case where there is no peak power limit for UE 102 and every complexity/delay cost of NOMA is acceptable for the network, such that the network always works in an NOMA mode. Then, using (1.ii), we have $$P_2 = \frac{2^{R_2} - 1}{G_2}$$

and, from (1.i), the achievable rate of UE 101 is found as $R_{1,NOMA} = \log_2(1 + 2^{-R_2} P_1 G_1)$. In this way, setting α=0.5, UE 101 has higher rate in NOMA, compared to OMA, if $\log_2(1 + 2^{-R_2} P_1 G_1) > 0.5 \log_2(1 + 2 P_1 G_1)$. Considering a Rayleigh-fading channel, UE 101-AP distance 10 m and path loss exponent 2, FIG. 2 shows $\Pr(\log_2(1 + 2^{-R_2} P_1 G_1) > 0.5 \log_2(1 + 2 P_1 G_1))$, i.e., the probability that NOMA-based transmission improves the achievable rate of UE 101, compared to that achieved by OMA, as a function of the UE 102 rate request $R_2$. Here, the results are presented for 35 and 40 dBm transmit powers of UE 101. As demonstrated in FIG. 2, unless UE 102 requests an impractically high capacity (which is not granted in practice, due to UE 102 peak power limit), even in the worst-case scenario not only the UE 102 fairness constraint is satisfied with the proposed scheme but also, with high probability, UE 101 gains from NOMA-based data transmission.

Figure 3:
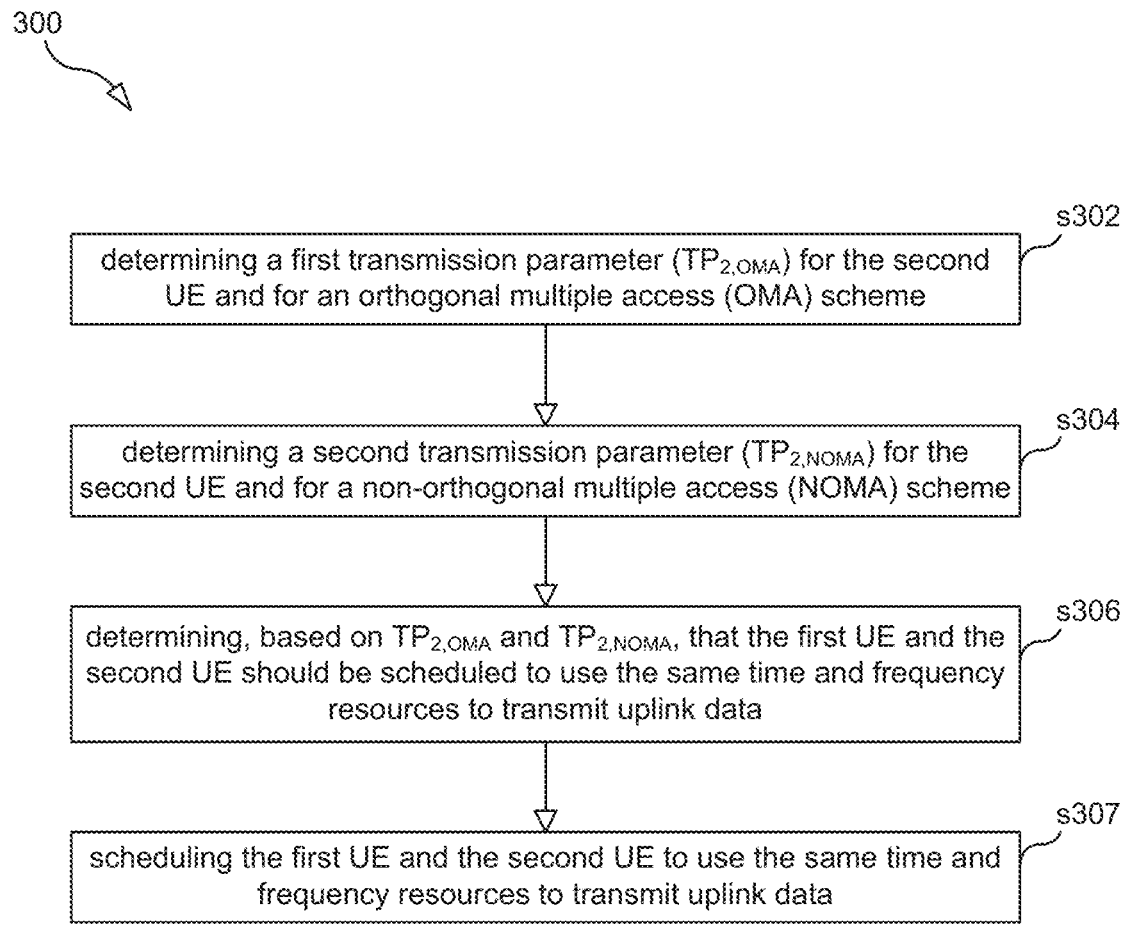
FIG. 3 is a flow chart illustrating a process according to one embodiment.

FIG. 3 is a flow chart illustrating a process 300, according to some embodiments, that is performed by a AP 105 for scheduling at least a first UE (e.g., UE 101) served by AP 105 and a second UE (e.g., UE 102) also served by AP 105. As shown in FIG. 3, process 300 may begin in step s302 in which AP 105 determines a first transmission parameter for the second UE and for an orthogonal multiple access (OMA) scheme ($TP_{2,OMA}$). In step s304, AP 105 determines a second transmission parameter for the second UE and for a non-orthogonal multiple access (NOMA) scheme ($TP_{2,NOMA}$). In step s306, AP 105 determines, based on $TP_{2,OMA}$ and $TP_{2,NOMA}$, that the first UE and the second UE should be scheduled to use the same time and frequency resources to transmit uplink data. In step s308, AP 105 schedules the first UE and the second UE to use the same time and frequency resources to transmit uplink data.

In some embodiments, $TP_{2,OMA}$ is a first transmit power ($P_{2,OMA}$) for the second UE and for the OMA scheme, and $TP_{2,NOMA}$ is a second transmit power ($P_{2,NOMA}$) for the second UE and for the NOMA scheme.

In some embodiments, determining, based on $TP_{2,OMA}$ and $TP_{2,NOMA}$, that the first UE and the second UE should be scheduled to use the same time and frequency resources to transmit uplink data comprises at least one of: 1) determining that: a) $P_{2,NOMA}$ is not greater than a power threshold and b) $P_{2,OMA}$ is greater than the power threshold; and 2) determining that: a) $P_{2,NOMA}$ is not greater than the power threshold and b) a relative power gain value is not less than a power gain threshold. In some embodiments, the relative power gain value equals:

$$(P_{2,OMA} - P_{2,NOMA})/P_{2,NOMA}.$$

Figure 4:
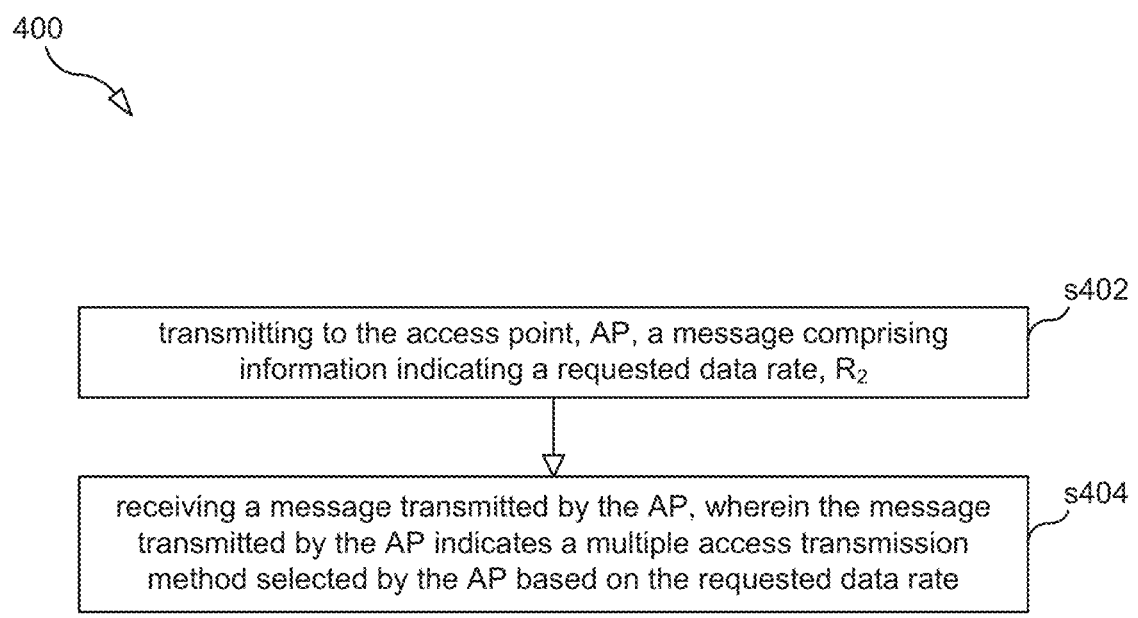
FIG. 4 is a flow chart illustrating a process according to one embodiment.

FIG. 4 is a flow chart illustrating a process 400, according to some embodiments, that is performed by UE 102 for transmitting data for reception by AP 105. As shown in FIG. 4, process 400 may begin in step s402 in which UE 102 transmits to AP 105 a message comprising information indicating a requested data rate, $R_2$ (the UE may also send information indicating whether it can support NOMA or not). In step s404, the UE 102 receives a message transmitted by the AP, wherein the message transmitted by the AP indicates a multiple access transmission method selected by the AP based on (i.e., in dependence on) the requested data rate (e.g., a multiple access transmission method selected using the logic described above). In some embodiments, the process further includes UE 102 receiving a synchronization signal transmitted by AP 105 as a result of AP 105 selecting a NOMA transmission method in dependence on the requested data rate.

Figure 5:
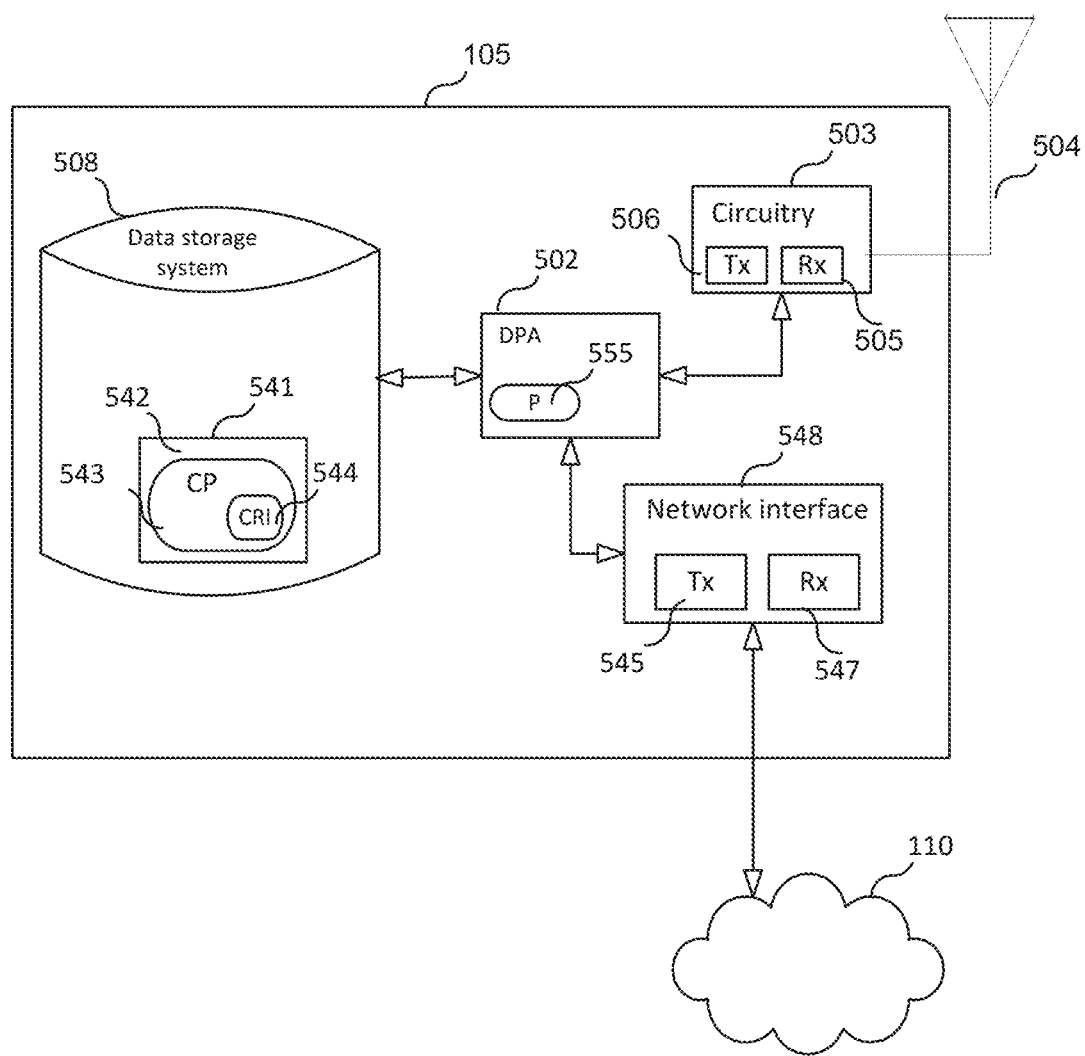
FIG. 5 is a block diagram of an access point according to one embodiment.

FIG. 5 is a block diagram of AP 105 according to some embodiments. As shown in FIG. 5, AP 105 may comprise: processing circuitry (PC) 502, which may include one or more processors (P) 555 (e.g., a general purpose microprocessor and/or one or more other processors, such as an application specific integrated circuit (ASIC), field-programmable gate arrays (FPGAs), and the like); a network interface 548 comprising a transmitter (Tx) 545 and a receiver (Rx) 547 for enabling AP 105 to transmit data to and receive data from other nodes connected to a network 110 (e.g., an Internet Protocol (IP) network) to which network interface 548 is connected; circuitry 503 (e.g., radio transceiver circuitry comprising an Rx 505 and a Tx 506) coupled to an antenna system 504 for wireless communication with UEs); and local storage unit (a.k.a., "data storage system") 508, which may include one or more non-volatile storage devices and/or one or more volatile storage devices (e.g., random access memory (RAM)). In embodiments where DPA 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited, to magnetic media (e.g., a hard disk), optical media, memory devices (e.g., random access memory, flash memory), and the like. In some embodiments, the CRI 544 of computer program 543 is configured such that when executed by data processing apparatus 502, the CRI causes AP 105 to perform steps described herein (e.g., steps described herein with reference to the flow charts and/or message flow diagrams). In other embodiments, AP 105 may be configured to perform steps described herein without the need for code. That is, for example, DPA 502 may consist merely of one or more ASICs. Hence, the features of the embodiments described herein may be implemented in hardware and/or software.

Figure 6:
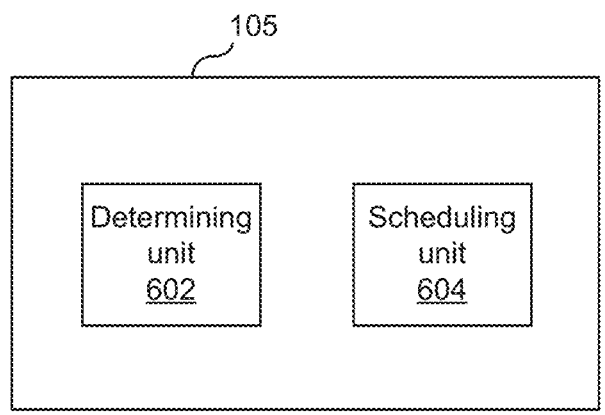
FIG. 6 is a diagram showing functional units of an access point according to one embodiment.

FIG. 6 is a diagram showing functional units of AP 105 according to some embodiments. As shown in FIG. 6, AP 105 includes a determining unit 602 for: a) determining a first transmission parameter for a second UE and for an orthogonal multiple access (OMA) scheme ($TP_{2,OMA}$); b) determining a second transmission parameter for the second UE and for a non-orthogonal multiple access (NOMA) scheme ($TP_{2,NOMA}$); and c) determining, based on $TP_{2,OMA}$ and $TP_{2,NOMA}$, that the second UE and a first UE should be scheduled to use the same time and frequency resources to transmit uplink data. AP 105 further includes a scheduling unit 604 for scheduling the first UE and the second UE to use the same time and frequency resources to transmit uplink data.

Figure 7:
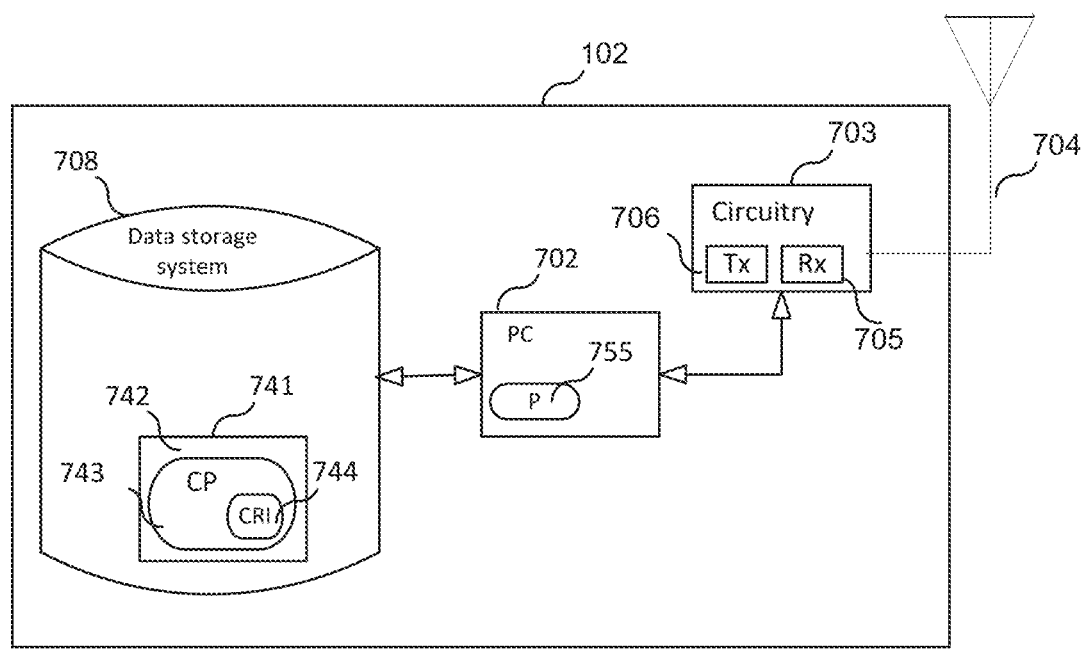
FIG. 7 is a block diagram of a UE according to one embodiment.

FIG. 7 is a block diagram of UE 102 according to some embodiments. As shown in FIG. 7, UE 102 may comprise: a data processing apparatus (DPA) 702 (i.e., processing circuitry), which may include one or more processors (P) 755 (e.g., a general purpose microprocessor and/or one or more other processors, such as an application specific integrated circuit (ASIC), field-programmable gate arrays (FPGAs), and the like); circuitry 703 (e.g., radio transceiver circuitry comprising a receiver (Rx) 705 and a transmitter (Tx) 706) coupled to an antenna system 704 for wireless communication with access points and/or other UEs); and local storage unit (a.k.a., "data storage system") 708, which may include one or more non-volatile storage devices and/or one or more volatile storage devices (e.g., random access memory (RAM)). In embodiments where DPA 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media, memory devices (e.g., random access memory, flash memory), and the like. In some embodiments, the CRI 744 of computer program 743 is configured such that when executed by data processing apparatus 702, the CRI causes UE 102 to perform steps described herein (e.g., steps described herein with reference to the flow charts and/or message flow diagrams). In other embodiments, UE 102 may be configured to perform steps described herein without the need for code. That is, for example, DPA 702 may consist merely of one or more ASICs. Hence, the features of the embodiments described herein may be implemented in hardware and/or software.

Figure 8:
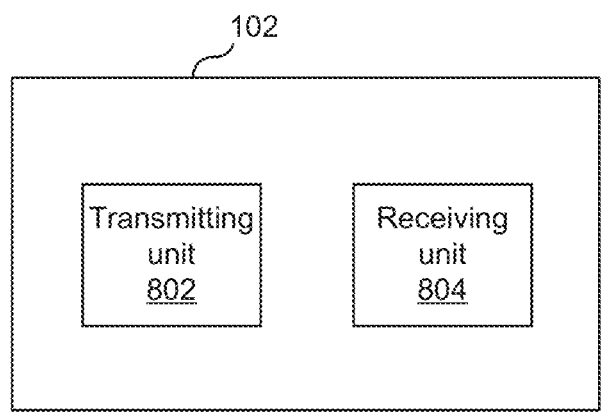
FIG. 8 is a diagram showing functional units of a UE according to one embodiment.

FIG. 8 is a diagram showing functional units of UE 102 according to some embodiments. As shown in FIG. 8, UE 102 includes: a transmitting unit 802 for transmitting to an access point (AP) a message comprising information indicating a requested data rate, $R_2$; and a receiving unit 804 for receiving a message transmitted by the AP, wherein the message transmitted by the AP indicates a multiple access transmission method selected by the AP based on the requested data rate.

Figure 9:
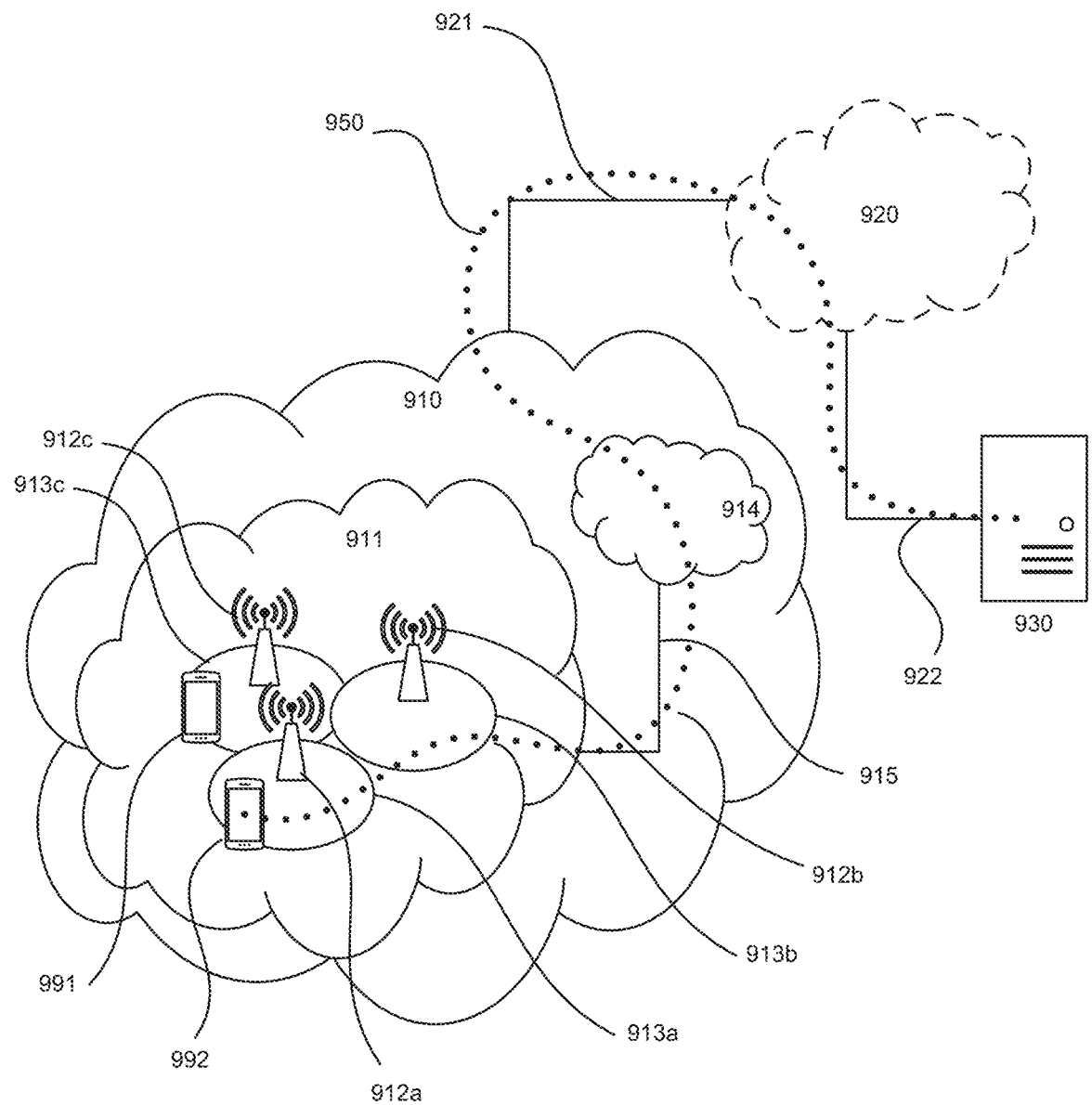
FIG. 9 schematically illustrates a telecommunication network connected via an intermediate network to a host computer.

FIG. 9 illustrates a telecommunication network connected via an intermediate network to a host computer in accordance with some embodiments. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of APs (hereafter base stations) 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10, which illustrates a host computer communicating via a base station with a user equipment over a partially wireless connection in accordance with some embodiments. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
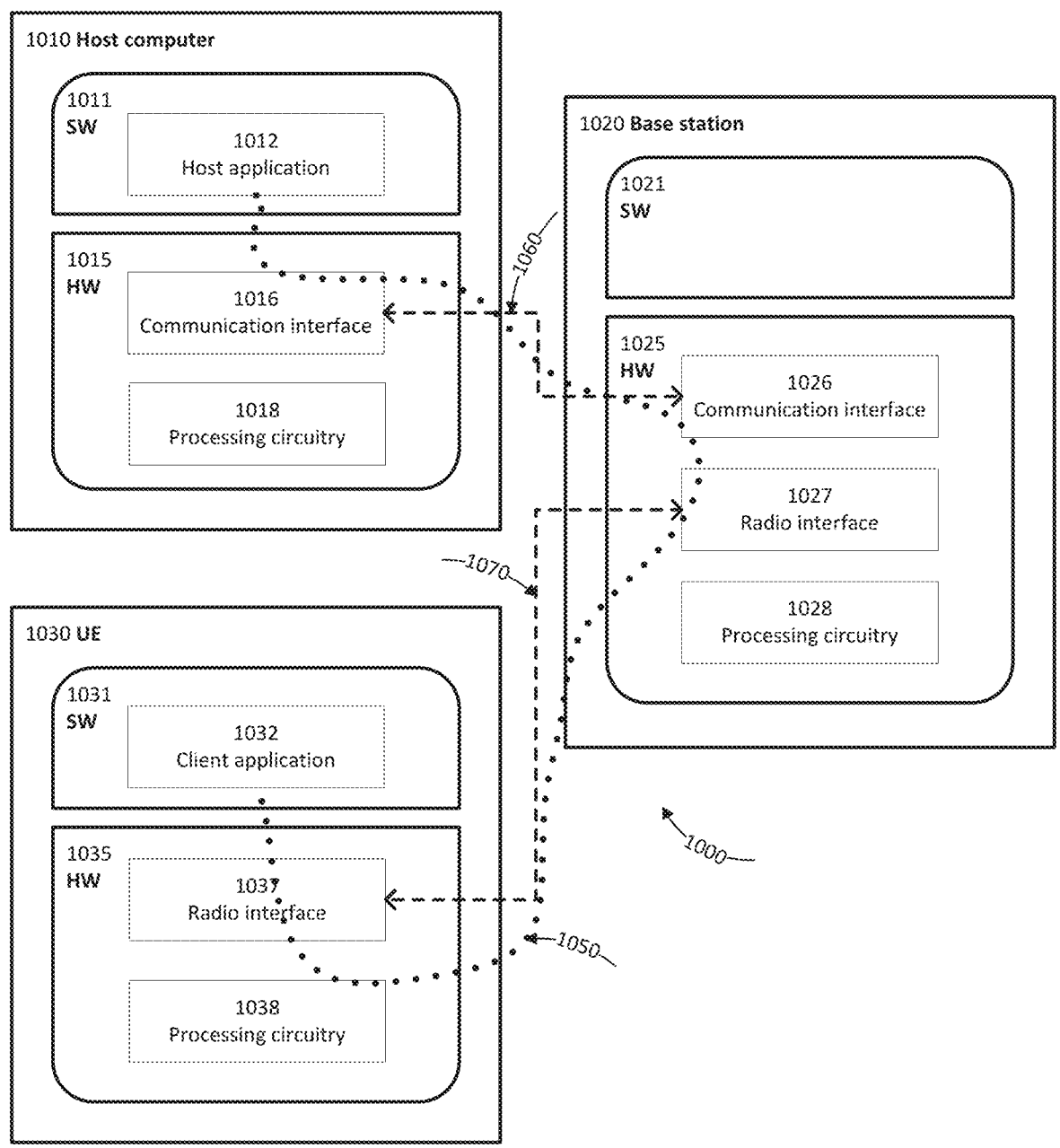
FIG. 10 is a generalized block diagram of a host computer communicating via a base station with a user equipment over a partially wireless connection.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc..

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
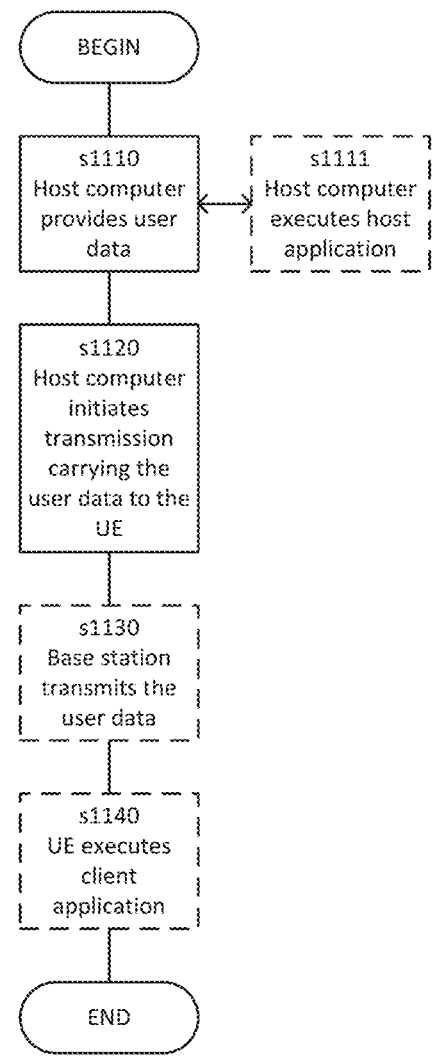
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 9 and FIG. 10. In step S1110, the host computer provides user data. In substep S1111 (which may be optional) of step S1110, the host computer provides the user data by executing a host application. In step S1120, the host computer initiates a transmission carrying the user data to the UE. In step S1130 (which may be optional), the base station transmits to the UE the user data which was carried in the transmission that the host computer initiated, in accordance with the teachings of the embodiments described throughout this disclosure. In step S1140 (which may also be optional), the UE executes a client application associated with the host application executed by the host computer.

Figure 12:
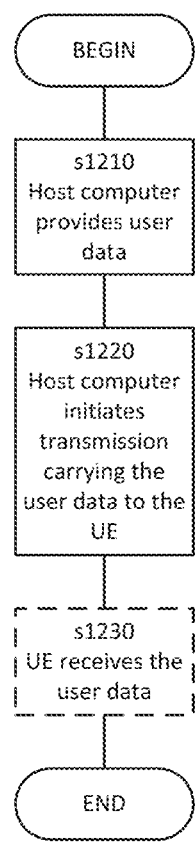
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 12 will be included in this section. In step S1210 of the method, the host computer provides user data. In an optional substep (not shown) the host computer provides the user data by executing a host application. In step S1220, the host computer initiates a transmission carrying the user data to the UE. The transmission may pass via the base station, in accordance with the teachings of the embodiments described throughout this disclosure. In step S1230 (which may be optional), the UE receives the user data carried in the transmission.

Figure 13:
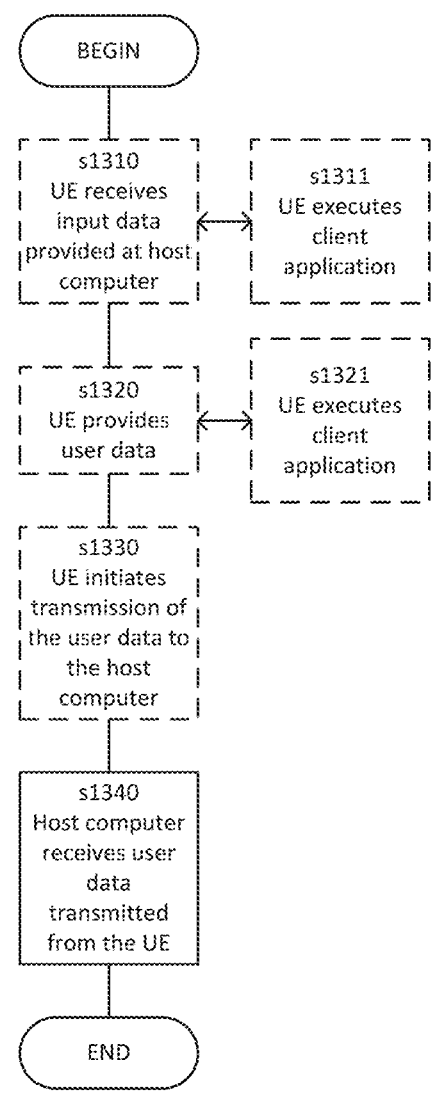
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 13 will be included in this section. In step S1310 (which may be optional), the UE receives input data provided by the host computer. Additionally or alternatively, in step S1320, the UE provides user data. In substep S1321 (which may be optional) of step S1320, the UE provides the user data by executing a client application. In substep S1311 (which may be optional) of step S1310, the UE executes a client application which provides the user data in reaction to the received input data provided by the host computer. In providing the user data, the executed client application may further consider user input received from the user. Regardless of the specific manner in which the user data was provided, the UE initiates, in substep S1330 (which may be optional), transmission of the user data to the host computer. In step S1340 of the method, the host computer receives the user data transmitted from the UE, in accordance with the teachings of the embodiments described throughout this disclosure.

Figure 14:
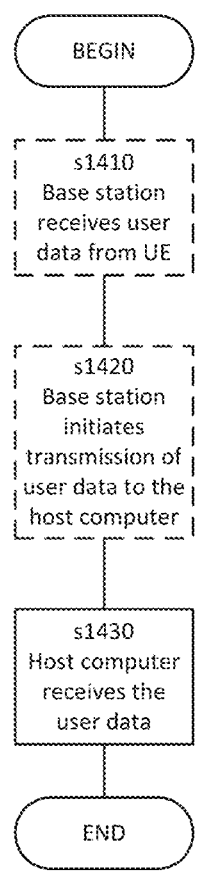
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 14 will be included in this section. In step S1410 (which may be optional), in accordance with the teachings of the embodiments described throughout this disclosure, the base station receives user data from the UE. In step S1420 (which may be optional), the base station initiates transmission of the received user data to the host computer. In step S1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an access point (AP) for scheduling at least a first user equipment (UE) served by the AP and a second UE also served by the AP, the method comprising:
    calculating a first transmission parameter ($TP_{2,OMA}$) for the second UE and for an orthogonal multiple access (OMA) scheme;
    calculating a second transmission parameter ($TP_{2,NOMA}$) for the second UE and for a non-orthogonal multiple access (NOMA) scheme;
    determining, based on the calculated transmission parameters $TP_{2,OMA}$ and $TP_{2,NOMA}$, that the first UE and the second UE should be scheduled to use the same time and frequency resources to transmit uplink data; and
    scheduling the first UE and the second UE to use the same time and frequency resources to transmit uplink data, wherein
    the method further comprises: i) obtaining a data rate value (R) indicating a data rate requirement for the second UE and ii) obtaining a channel gain value (G) indicating a gain of a channel between the second UE and the AP,
    calculating $TP_{2,OMA}$ comprises calculating $TP_{2,OMA}$ using R and G as inputs to the calculation, and
    calculating $TP_{2,NOMA}$ comprises calculating $TP_{2,NOMA}$ using R and G as inputs to the calculation.

2. The method of claim 1, wherein
    $TP_{2,OMA}$ is a first transmit power ($P_{2,OMA}$) for the second UE and for the OMA scheme, and
    $TP_{2,NOMA}$ is a second transmit power ($P_{2,NOMA}$) for the second UE and for the NOMA scheme.

3. The method of claim 2, wherein determining, based on $TP_{2,OMA}$ and $TP_{2,NOMA}$, that the first UE and the second UE should be scheduled to use the same time and frequency resources to transmit uplink data comprises at least one of:
    1) determining that: a) $P_{2,NOMA}$ is not greater than a power threshold and b) $P_{2,OMA}$ is greater than the power threshold; or
    2) determining that: a) $P_{2,NOMA}$ is not greater than the power threshold and b) a relative power gain value is not less than a power gain threshold.

4. The method of claim 3, wherein the relative power gain value equals:

$$(P_{2,OMA} - P_{2,NOMA})/P_{2,NOMA}.$$

5. A computer program product comprising a non-transitory computer readable medium storing a computer program, comprising instructions which, when executed on at least one processor of an access point, cause the access point to carry out the method of claim 1.

6. The method of claim 1, wherein the step of determining, based on $TP_{2,OMA}$ and $TP_{2,NOMA}$, that the first UE and the second UE should be scheduled to use the same time and frequency resources comprises:
    determining whether $TP_{2,NOMA}$ is not greater than a threshold; and
    determining whether $TP_{2,OMA}$ is greater than the threshold, further wherein
    the determination that the first UE and the second UE should be scheduled to use the same time and frequency resources to transmit uplink data is made as a result of determining that $TP_{2,NOMA}$ is not greater than the threshold and $TP_{2,OMA}$ is greater than the threshold.

7. The method of claim 1, wherein the step of determining, based on $TP_{2,OMA}$ and $TP_{2,NOMA}$, that the first UE and the second UE should be scheduled to use the same time and frequency resources comprises:
    determining whether $TP_{2,NOMA}$ is not greater than a first threshold; and
    calculating a difference (D) between $TP_{2,NOMA}$ and $TP_{2,OMA}$, further wherein
    the determination that the first UE and the second UE should be scheduled to use the same time and frequency resources to transmit uplink data is made as a result of determining that $TP_{2,NOMA}$ is not greater than the first threshold and the value D satisfies a condition.

8. The method of claim 7, wherein
    the step of determining, based on $TP_{2,OMA}$ and $TP_{2,NOMA}$, that the first UE and the second UE should be scheduled to use the same time and frequency resources comprises determining whether D satisfies the condition,
    determining whether D satisfies the condition comprises calculating $D/TP_{2,NOMA}$, and
    D satisfies the condition if $D/TP_{2,NOMA}$ is greater than a second threshold.

9. A method performed by a user equipment (UE) for transmitting data for reception by an access point, the method comprising:
    transmitting to the access point (AP) a message comprising information indicating a requested data rate, $R_2$; and
    receiving a message transmitted by the AP, wherein the message transmitted by the AP indicates a multiple access transmission method selected by the AP based on the requested data rate, wherein
    the message transmitted to the AP and comprising the information indicating the requested data rate comprises a buffer status report specifying an amount of data that the UE has queued for uplink transmission, and
    the specified amount of data that the UE has queued for uplink transmission indicates the requested data rate.

10. The method of claim 9, further comprising
    receiving a synchronization signal transmitted by the AP as a result of the AP selecting a non-orthogonal multiple access (NOMA) transmission method in dependence on the requested data rate.

11. A computer program product comprising a non-transitory computer readable medium storing a computer program, comprising instructions which, when executed on at least one processor of a user equipment, cause the user equipment to carry out the method of claim 9.

12. An access point (AP) for scheduling at least a first user equipment (UE) served by the AP and a second UE also served by the AP, the AP being adapted to:
calculate a first transmission parameter ($TP_{2,OMA}$) for the second UE and for an orthogonal multiple access (OMA) scheme;
calculate a second transmission parameter ($TP_{2,NOMA}$) for the second UE and for a non-orthogonal multiple access (NOMA) scheme;
determine, based on the calculated transmission parameters $TP_{2,OMA}$ and $TP_{2,NOMA}$, that the first UE and the second UE should be scheduled to use the same time and frequency resources to transmit uplink data; and
schedule the first UE and the second UE to use the same time and frequency resources to transmit uplink data, wherein
the AP is further configured to: i) obtain a data rate value (R) indicating a data rate requirement for the second UE and ii) obtain a channel gain value (G) indicating a gain of a channel between the second UE and the AP,
the AP is configured to calculate $TP_{2,OMA}$ by calculating $TP_{2,OMA}$ using R and G as inputs to the calculation, and
the AP is configured to calculate $TP_{2,NOMA}$ by calculating $TP_{2,NOMA}$ using R and G as inputs to the calculation.

13. The access point of claim 12, wherein
$TP_{2,OMA}$ is a first transmit power ($P_{2,OMA}$) for the second UE and for the OMA scheme, and
$TP_{2,NOMA}$ is a second transmit power ($P_{2,NOMA}$) for the second UE and for the NOMA scheme.

14. The access point of claim 13, wherein determining, based on $TP_{2,OMA}$ and $TP_{2,NOMA}$, that the first UE and the second UE should be scheduled to use the same time and frequency resources to transmit uplink data comprises at least one of:
1) determining that: a) $P_{2,NOMA}$ is not greater than a power threshold and b) $P_{2,OMA}$ is greater than the power threshold; or
2) determining that: a) $P_{2,NOMA}$ is not greater than the power threshold and b) a relative power gain value is not less than a power gain threshold.

15. The access point of claim 14, wherein the relative power gain value equals:

$$(P_{2,OMA} - P_{2,NOMA})/P_{2,NOMA}.$$

16. A user equipment (UE) for transmitting data for reception by an access point, the UE being adapted to:
transmit to the access point (AP) a message comprising information indicating a requested data rate, $R_2$; and
receive a message transmitted by the AP, wherein the message transmitted by the AP indicates a multiple access transmission method selected by the AP based on the requested data rate, wherein
the information indicating the requested data rate comprises a buffer status report specifying an amount of data that the UE has queued for uplink transmissions.

17. The UE of claim 16, wherein the UE is further adapted to receive a synchronization signal transmitted by the AP as a result of the AP selecting a non-orthogonal multiple access (NOMA) transmission method in dependence on the requested data rate.

* * * * *